Patented May 23, 1933

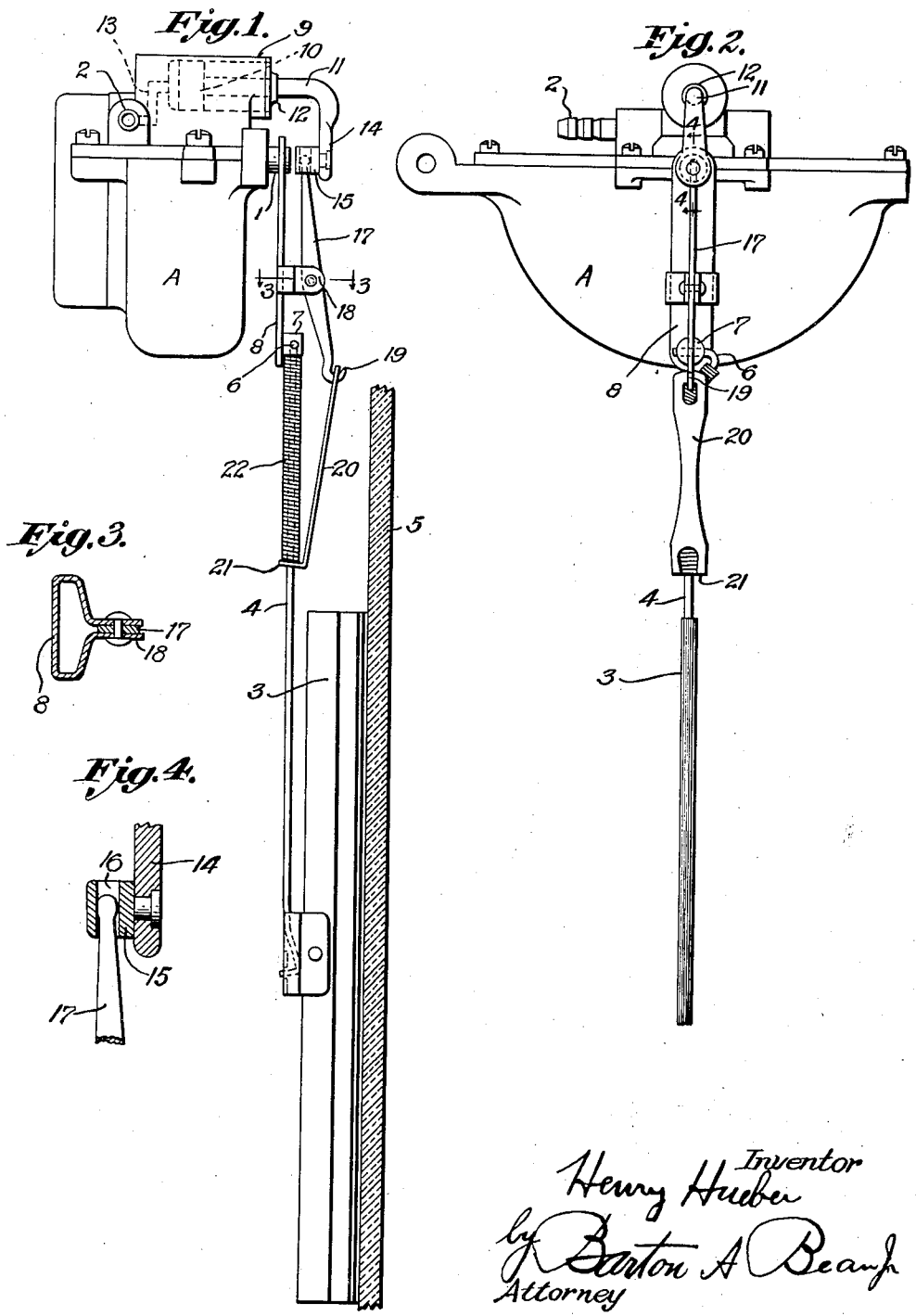

1,911,155

UNITED STATES PATENT OFFICE

HENRY HUEBER, OF BUFFALO, NEW YORK, ASSIGNOR TO TRICO PRODUCTS CORPORATION, OF BUFFALO, NEW YORK

WINDSHIELD CLEANER

Application filed February 6, 1928. Serial No. 252,098.

This invention relates to windshield cleaners of the automatic type. In cleaners of the power-operated type, whether electrically or of the air-pressure or so-called suction-operated type, the methods of obtaining the proper and most effective wiping contact of the wiper element on the windshield glass, as heretofore practiced, have not been satisfactory. Various attempts have been made to provide a clean wiping action, such as by providing a resiliency in the wiper arm, or, in the mounting of the wiper arm, whereby a constant or fixed pressure is provided while in operation as well as when inoperative. During the initial performance of a windshield cleaner in which a constant, fixed pressure is provided for urging the wiper against the windshield glass, the wiper functions very efficiently, but by reason of this constant pressure, the wiper blades, which usually embody a flexible rubber strip projecting from a rigid backing or holder, become distorted and deformed in that the flexible rubber strip will eventually become bent and set through oxidation whereby the same will not flex and flop back and forth as the wiper is reciprocated. Consequently, the wiping efficiency of the blade will obviously be impaired. If the spring pressure is lightened, the windshield cleaner motor will, of course, accelerate and fail to properly clean the windshield glass by reason of an inefficient wiping contact.

Furthermore, in automatic cleaners of the air-pressure or suction-operated type, the variation in the degree of pressure available for operating the windshield cleaner motor will effect an irregular operation of the windshield cleaner motor, accelerating from a normal when the available pressure is great, and reducing its action when the available pressure is very small. Therefore, if the wiper is pressed more heavily against the windshield glass when the application of power to the windshield cleaner motor is larger, the speed of the motor will be rendered more uniform and a more efficient wiping action will result.

The present invention contemplates an automatic regulation of the wiping contact of the wiper blade or member on the windshield glass in accordance with the available power for the windshield cleaner motor, whereby the greater the available or applied power the greater will be the pressure of the wiper on the windshield, and it has for its objects to provide a windshield cleaner in which the speed of the cleaner motor will be governed by a variation in the wiping pressure or contact of the wiper on the windshield glass; to provide a windshield cleaner in which the wiper at all times has a regulatable wiping contact with the glass during wiping movement; to provide a windshield cleaner in which the pressure or wiping contact of the wiper upon the glass is varied in accordance with the amount of power applied to the motor; and to provide a windshield cleaner in which the wiping contact or pressure of the blade on the glass will be relieved when the windshield cleaner is rendered inoperative.

The invention further resides in the features of construction and their arrangements and combinations of parts hereinafter described in detail and set forth in the claims, reference being had to the accompanying drawing wherein, Fig. 1 is a side elevation of a windshield cleaner constructed in accordance with the present invention, a portion of the windshield being shown in section, Fig. 2 is a elevation of the improved windshield cleaner as viewed at right angles to the point of view in Fig. 1, portions of the cleaner being broken away, Fig. 3 is a detail cross sectional view on line 3—3 of Fig. 1, and Fig. 4 is a detail vertical sectional view about on line 4—4 of Fig. 2.

In proceeding in accordance with the present invention the pressure of the wiper against the windshield glass is regulated by and varied in accordance with the operating power applied to the windshield cleaner motor, and the speed of the windshield cleaner is thereby rendered substantially constant by such controlled wiping contact or pressure. In the form illustrated, this automatic regulation is provided by a mechanism which is fluid pressure actuated since this force is utilized to operate the windshield cleaner motor, and the degree of wiping pressure exerted by the wiper upon the windshield glass is proportionate to the power applied to the windshield cleaner motor. In the drawing there is illustrated a fluid pressure or so-called suction-operated windshield cleaner having a cylinder and piston construction, and the piston is of the vane type and is fixed to a rock shaft 1 to operate the same. The operating pressure is supplied from a suitable source, such as the intake manifold of an internal combustion engine, to the primary suction passage 2 of the cleaner motor from which the pressure is applied alternately to the opposite sides of the vane-piston. This primary suction passage is opened and closed to the source of suction by means of a control valve (not shown), and where the windshield cleaner motor is mounted on the front or exterior side of the windshield of the motor vehicle, as shown in Fig. 1, this control valve will obviously be located on the instrument board readily accessible to the driver of the vehicle. The wiper blade or strip 3 is mounted on the lower end of the wiper-carrying arm 4, the latter being pivotally connected to the rock shaft 1 for swinging in a plane perpendicular to the windshield glass 5. In the showing in Fig. 1 this pivotal connection is an indirect one, the upper end of the wiper arm having its angularly disposed pintle 6 detachably pivoting in a stud 7 carried by an intermediate member 8 which is fixed on the rock shaft 1, so that said member 8 practically constitutes an arm or lateral extension of said shaft and is rockable therewith as a unit.

Normally when the motor A is at rest the wiper blade is relieved from pressure against the glass 5 so that when the windshield cleaner is not in use the flexible wiping portion of the wiper blade or strip will not be distorted or deformed but will spring out to substantially retain its original formation and shape. In accordance with the present invention means are provided for automatically bringing this wiper blade into operative or efficient wiping contact with the glass as by increasing the pressure of the wiper blade on the glass. As above set forth, this automatic, wiping-pressure regulator operates proportionately with the power applied to the windshield cleaner motor A. This automatic control embodies an auxiliary motor, for instance, of the single-acting type, having a cylinder 9 and a piston 10 therein having its piston rod 11 extending freely through the unpacked head 12 of the cylinder 9 whereby the adjacent side of the piston will be in constant communication with the atmosphere. The opposite side of the piston 10 is open to the source of suction or low pressure and this communication with the source of suction is preferably controlled by the motor-controlling valve (not shown) mounted on the instrument board of the motor vehicle. The cylinder 9 is preferably formed as an integral part of the motor A or rigidly attached thereto, the same being shown herein carried by the removable top plate of said motor A and the low pressure side of the piston 10 has communication with the primary suction passage 2 by means of a conduit 13 so that when the motor is set in operation, by being connected to the source of suction, such suction will simultaneously be admitted to the cylinder 9 for drawing inwardly the piston 10.

The auxiliary motor has a part, the outer end of the piston rod 11, extending laterally across the pivotal axis of the rock shaft 1, as indicated at 14. Pivotally mounted in this lateral extension 14, co-axially with the rock shaft 1, is a swiveled bearing block 15 having a recess 16 therein. Engaged in this recess is the balled or rounded end of a tensioning lever 17 which is fulcrumed intermediate its ends between a pair of ears 18 on the arm 8, the opposite end of the lever 17 terminating in a hook 19 over which is engaged one end of a stirrup member 20. This stirrup is shown provided with a foot 21 at its opposite end for engaging about the wiper arm 4 and supporting a coiled spring 22 on said arm. The stirrup normally supports the coiled spring 22 under compression so that the resultant upward force of the spring will hold the wiper arm against displacement from the bearing 7 and the downward force of said spring on the stirrup will tend to pull the wiper moving arm 4 counter-clockwise, with respect to Fig. 1, and press the blade 3 against the glass 5. Obviously, the spring will also act to rock the lever 17 and urge the piston outwardly against the suction influence. This will tend to pull the piston rod 11 outwardly when the source of motive power is shut off, and will resist the inward movement of the piston 10 when the motive power is turned on. As this resistance is overcome, by an increase in the degree of suction, the piston 10 will move inwardly to effect further compression of the spring 22 and a consequently greater wiping pressure of the wiper 3 against the glass 5. Obviously, the greater the degree of motive power to which the motor A is subjected, the greater will be the inward urging of the piston 10, resulting in a greater compression of the spring 22 and a heavier contact of the wiper 3 with the glass 5.

During the operation of the cleaner, the arm 8 will be rocked with the shaft 1, and because the lever 17 is pivotally carried by said arm, it will rock therewith and result in moving the wiper arm 4 and the stirrup 20 in an arcuate path. Since the motor herein shown is of the oscillatory type the bearing block 15 on which the upper end of the lever 17 engages is arranged co-axially with the rock shaft. This arrangement will avoid rocking of the piston rod 11 and will locate the outward pull thereon at approximately the same point regardless of the position of the wiper blade 3.

It will, therefore, be observed that the wiper blade will be automatically relieved from a constantly heavy contact with the glass, when inoperative, and will, therefore, tend to retain its original formation against becoming deformed or oxidized in a deformed condition as heretofore has resulted by reason of the constant application of pressure urging it against the windshield glass when in a parked position, or when not being used. While the wiper blade is out of wiping contact with the glass when idle or inoperative, the moment the windshield cleaner motor is set in operation the same motive power also sets in operation the automatic control for placing the wiper in its wiping position, or in a position in which the contact or pressure against the glass is of such a degree as to effect a thorough cleaning of the glass. Likewise it will be noted that when the motive power available for operating the windshield cleaner motor is deficient or below an efficient normal, the wiping contact or pressure will lighten whereby the speed of the motor will maintain a constant normal in operation. As the available pressure increases beyond the efficient normal the wiping contact or pressure will increase and, therefore, resist an acceleration of the motor A. Consequently, in addition to obtaining a thorough cleaning action, the speed of the motor will be regulated and unified.

What is claimed is,

1. In a windshield cleaner, a suction-operated motor having a rock shaft, a wiper pivotally connected to the shaft for swinging toward and from the windshield glass to be served, a single-acting suction-operated motor operatively connected to the first motor and embodying a piston, and means including a lever part connected to the piston and having fulcrum support between the piston and the wiper and operable by said piston for urging the wiper away from the first motor and toward the windshield glass upon an increase in power applied to said first motor.

2. In a windshield cleaner, the combination with a main, wiper-operating motor having a rock shaft, a wiper connected to the rock shaft to oscillate therewith, of a single-acting, auxiliary motor having a piston rod carrying a part extending across the pivotal axis of said rock shaft, a bearing block pivotal on the piston rod co-axially with the rock shaft, and a lever mounted for swinging with the wiper and having one end engaged on the bearing block and its opposite end connected to the wiper for urging the latter toward the windshield glass.

3. A windshield cleaner comprising an actuator having a shaft with an axis of oscillation perpendicular to the windshield, a wiper carrying arm connected thereto for movement with the shaft in a plane parallel to the windshield and for movement relative to the shaft toward and from the windshield in a plane perpendicular thereto, a member pivoted to the shaft for rocking movement in a plane substantially perpendicular to the windshield, means connecting the member and the wiper carrying arm, and means coupled with the member, said last mentioned means being movable axially of the shaft for moving the wiper carrying arm to various positions to and from the plane of the windshield, thereby to adjust the pressure of wiping contact.

4. A windshield cleaner comprising a cleaner motor having a rock shaft and a removable cover plate, a wiper-carrying arm pivoted on said shaft, a spring engaged with said arm, a stirrup connected to the spring, and means for exerting a pull on said stirrup to stress the spring and thereby increase the wiping contact of the wiper with the glass, said means embodying a single-acting motor carried by said cover plate and having a cylinder integral with the plate and a piston and piston rod, the latter acting to exert a pull on said stirrup.

5. A windshield cleaner comprising a cleaner motor having a rock shaft with a laterally extending part, a wiper-carrying arm pivoted to said part, a coiled spring encircling said arm, a stirrup supporting the spring under compression for urging the arm-carried wiper toward the windshield glass, a single-acting motor having a piston and piston rod, and a lever pivoted on said rock shaft part and engaged at one end with the stirrup and engaging at its opposite end with said piston rod.

6. A windshield cleaner comprising a cleaner motor having a rock shaft with a laterally extending part, a wiper-carrying arm pivoted on said part, resilient means for urging the arm-carried wiper toward the windshield glass and including a bearing block swiveled co-axially with said rock shaft, a lever fulcrumed between its ends on said rock shaft part and having one end engaged with said bearing block and its opposite end engaged with said stirrup, and means for moving said bearing block axially of said shaft for rocking the lever, said last means acting in proportion to the power applied to the cleaner motor.

7. A windshield cleaner comprising a motor having a rock shaft at right angles to a windshield, said shaft having a laterally extending part, a wiper arm adjacent said windshield, a member pivoted to the laterally extending part on an axis spaced from and at right angles to the axis of the rock shaft, means connecting the arm and member whereby movement of the member about its pivotal axis will move the arm toward or away from the windshield, said member having a portion extending into a position adjacent to the end of said rock shaft, and means movable longitudinally of the axis of the rock shaft for moving said portion of the member.

8. A windshield cleaner comprising a cleaner motor having a rock shaft with a laterally extending part, a wiper carrying arm pivoted to said part, a coiled spring encircling said arm, a stirrup supporting the spring under compression, a lever pivoted to said rock shaft and engaged at one end with the stirrup, and means independent of angular movement of the rock shaft and movable axially thereof engaging the opposite end of the lever for moving a wiper toward and away from a windshield.

9. A windshield cleaner comprising a cleaner motor having a rock shaft with a laterally extending part, a wiper-carrying arm having one end secured to said part, a lever pivoted on said part, a member connecting one end of the lever to the arm for moving the latter when the lever is rocked, and pressure operated means for rocking said lever.

10. A windshield cleaner comprising a suction-operated motor consisting of a casing and a piston therein, said casing having a removable closure plate and said motor embodying a rock shaft, a fluid pressure operated mechanism arranged on and carried by said plate, a wiper-carrying arm pivotally connected to the rock shaft, and a spring device acting to urge the arm toward the associated windshield glass and embodying a movable member connected to said arm, said fluid pressure operated mechanism being connected to said movable member for operating the same.

11. A windshield cleaner comprising a suction-operated motor consisting of a casing and a piston therein, said casing having a removable closure plate and said motor embodying a rock shaft, a fluid pressure operated mechanism arranged on and carried by the removable closure plate, a wiper-carrying arm pivotally carried by the rock shaft, and a spring device acting to urge the arm toward the associated windshield glass and including a lever connected to said arm for swinging the same, said fluid pressure operated mechanism being operatively connected to said lever for rocking the same.

12. A windshield cleaner comprising a suction operated cleaner motor having a shaft, a wiper, a wiper carrying arm operable from the shaft, a rockable member carried by the shaft, being supported between its ends for rocking movement, a member connecting one end of the rockable member to the wiper carrying arm for urging the wiper toward the windshield glass, and suction operated means connected to the opposite end of the rockable member and acting in response to the suction available for the motor for rocking said rockable member to vary the wiping contact of the wiper with the glass in accordance with the available suction.

13. A windshield cleaner comprising a main motor having a wiper-operating shaft, a wiper-carrying arm connected to the shaft for operation thereby a secondary motor arranged to one side of the axis of said shaft and having a bearing part movable coaxially of said shaft, said secondary motor being connected to the source of power through the main motor, and means engaged by said bearing part and operatively connected to said wiper-carrying arm for urging the wiper carried by said arm into firmer contact with the windshield.

14. A windshield cleaner comprising an actuating shaft, a laterally extending part thereon, a wiper arm carried by said laterally extending part, spring means associated with the wiper arm and the laterally extending part for urging the arm toward the windshield, means carried by the laterally extending part and connected to said spring, said last mentioned means being movable relative to said laterally extending part for varying the pressure of said spring means.

HENRY HUEBER.